Figure 1:
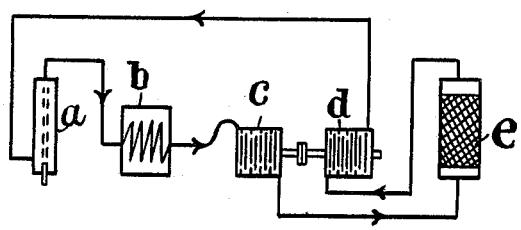

E. EDWIN.
TREATMENT OF GASES IN ELECTRIC FURNACES.
APPLICATION FILED AUG. 29, 1916.

1,263,389. Patented Apr. 23, 1918.

INVENTOR
Emil Edwin
By
ATTORNEY.

UNITED STATES PATENT OFFICE.

EMIL EDWIN, OF CHRISTIANIA, NORWAY, ASSIGNOR TO NORSK HYDRO-ELEKTRISK KVAELSTOFAKTIESELSKAB, OF CHRISTIANIA, NORWAY.

TREATMENT OF GASES IN ELECTRIC FURNACES.

1,263,389.  Specification of Letters Patent.  Patented Apr. 23, 1918.

Application filed August 29, 1916. Serial No. 117,492.

*To all whom it may concern:*

Be it known that I, EMIL EDWIN, a subject of the King of Norway, residing at Christiania, Norway, have invented certain new and useful Improvements in the Treatment of Gases in Electric Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a method of utilizing the heat energy of gases which have been treated in electric furnaces.

In the processes of nitrogen combustion, the supplied electric energy is but imperfectly utilized. Only the smallest part of the energy is directly transformed into chemical energy in the formation of nitrogen oxids, while the bulk is obtained as heat in the hot gases, leaving the furnace. The conditions may be improved to some degree by using high pressure in the furnaces. Then a greater yield of nitrogen oxids is obtained relatively to the expenditure of energy, but the advantage so obtained is in great measure counterbalanced by the complication that a compressor plant with consequent expenditure of energy is required to supply the air under pressure to the furnaces. Another method of obtaining an increased yield of nitrogen oxids consists in using a gas mixture richer in oxygen than the air, most profitably a mixture containing equal volumes of oxygen and nitrogen. In consideration of the cost arising from the preparation of pure oxygen one is then bound to combine the furnaces with the absorption plant and auxiliary apparatus into a closed system, in which the gases permanently circulate, the quantities of gas used up being from time to time supplied. Also in this case a compressor is required in order to maintain the differences of pressure that are necessary for the circulation of the gases in the system and just the same is the case when both the said expedients for increasing the yield are simultaneously made use of in working the closed system under pressure with air rich in oxygen.

When using a closed system, one has the further possibility of effecting also the absorption of the nitrogen oxids under pressure. This involves the important advantage that the absorption plant may be given a less dimension and consequently be much cheaper. This advantage may be utilized still more by maintaining the absorption system under even higher pressure than the furnaces, but one faces then again the necessity of using a compressor for producing this higher pressure, so that also in this case the profit is to be purchased at expenditure of energy.

Considering on the other hand the energy contained as heat in the hot gases leaving the furnace, it is evident that this energy may be utilized in different ways, for instance for the production of steam in passing the gases through steam-boilers. However, a considerable portion of the heat content, particularly the heat remaining in the gases after their having been cooled down to 250-300° C. cannot be utilized in this way, and is till now completely lost as the gases are efficiently cooled by means of a current of water in order to bring them down to the temperature suitable for absorption.

The present invention has for its object to utilize this hitherto worthless heat energy for working the compression device, that is to maintain the differences of pressure in the system.

To this purpose the heat energy of the gases is transformed into mechanical work in a hot-air turbine which drives the compressor. Provided the turbine is working adiabatically and the compressor as nearly isothermally as feasible, it will be within the range of possibility with the normal efficiencies of these kinds of engines to save 2/3 or even more of the compressor work, so that only the remaining 1/3 or less is to be supplied from external sources, for instance from an electromotor.

In order to keep the pressure as constant as possible, which is essential to the stability of the flame, it is of great importance that the velocity of the compressor should correspond to any variations in the velocity of the turbine and this may be realized in using a rotary compressor placed directly on the driving shaft of the turbine. Small variations of pressure will moreover be equalized on account of the relatively large volume of the absorption plant.

Figure 2:
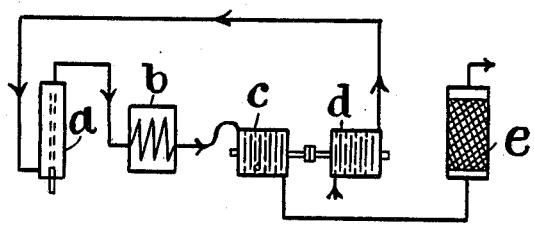

The manner in which the invention is carried out is shown diagrammatically in Figures 1 and 2 of the annexed drawing, in which $a$ indicates the furnace, $b$ a device, such as a boiler, for cooling the hot furnace gases under simultaneous utilization of a great deal of their heat, $c$ is the hot-air turbine, $d$ the rotary compressor placed on the turbine shaft and $e$ the absorption plant.

Fig. 1 illustrates the case in which the furnace stands under higher pressure than the absorption system. The gases from the furnace arc pass through steam-boilers to the hot-air turbine, where their heat is utilized under expansion, and then farther to the absorption system. From the outlet of the latter, the gases are sucked off by the compressor, which brings them again up to the pressure used in the furnace.

Fig. 2 shows an arrangement, where the furnace is working under pressure but the system is open. Here the residual gases from the absorption plant pass into the open air, while the compressor continuously takes in fresh air and brings it up to the furnace pressure.

The arrangement above described is mainly destined for the process of nitrogen combustion in electric furnaces, but it is understood, that the underlying principles may easily be modified for the use in other processes of analogous nature i. e. processes working with a system in which hot gases are circulating and where the different parts of the system have considerable differences of pressure.

So for instance the invention may be used in the manufacture of aluminum nitrid from alumina, carbon and nitrogen. When in this and other similar processes circulating nitrogen is used, it will be necessary to insert in the system a device for eliminating the carbon monoxid from the gases, before the latter are reused, and the system of such processes is then on principle corresponding to that illustrated in Fig. 1.

I claim:

1. The method of utilizing the heat energy of gases that have been treated in an electric arc furnace, comprising causing the gases from said furnace to continuously expand and simultaneously develop mechanical energy and cool the gases, and utilizing said energy in synchronism with its production to compress gases to the pressure at which they are used in said furnace, thereby stabilizing the arc and maintaining a velocity and energy production in accordance with the furnace operation.

2. The method of utilizing the heat energy of gases which have been treated in electric furnaces, particularly in nitrogen combustion furnaces, which comprises causing the gases to transform their heat energy into mechanical work and velocity in a hot-air turbine and driving a compressor from said turbine, said compressor supplying the gases used in the process to that part of the system which stands under the higher pressure.

3. The method of utilizing the heat energy of gases which have been treated in an electric arc furnace, which comprises causing a drop of energy in said gases between two elements of a plant, one of said elements being the arc furnace and the other element an absorber, thereby cooling the gases, transforming said energy by continuous compression of gases at approximately the same difference of pressure substantially in synchronism with a continuous development of said energy, and supplying the compressed gases to that element under the higher pressure, thereby stabilizing the arcs.

4. The method of utilizing the heat energy of gases which have been treated in electric furnaces for nitrogen combustion, comprising passing the gases through a drop of pressure between the furnace and the absorption plant and causing them to transform their heat energy into mechanical work in a hot air turbine, the latter driving a rotary compressor directly connected thereto and working approximately at the same pressure difference as the turbine, and supplying the gases used in the process to that part of the system which stands under the higher pressure.

5. The method of utilizing the heat energy of gases which have been treated in electric nitrogen combusting furnaces, comprising passing the gases through a drop of pressure between the furnace and the absorption plant, transforming the heat energy of the gases during said drop of energy into mechanical work in a hot-air turbine and simultaneously cooling them, driving a rotary compressor from said turbine, said compressor working approximately at the said pressure difference as the turbine and effecting the circulation of the gases in the system and simultaneously supplying the necessary quantity of pure oxygen to the system.

6. The method of utilizing the heat energy of gases that have been treated in nitrogen combustion furnaces, comprising causing the gases to transform their heat energy into mechanical energy, two elements, one of them an electric arc furnace and the other an absorber, both of said elements being under pressure considerably above atmospheric pressure but one of said elements being at a higher pressure than the other, said transformation of energy being by continuous expansion operating to compress gases to substantially the higher pressure at the same rate of energy exchange as that due to expansion, and supplying said compressed gases to the element under the higher pressure.

7. In the utilization of the heat energy of gases two devices, one of them an electric furnace and the other an absorption device, the method which comprises passing the gases through a drop of pressure from one device to the other, transforming the heat energy of the gases during said drop of pressure into mechanical work in a hot air turbine and thereby cooling them, driving a rotary compressor from said turbine, said compressor operating at approximately the same pressure difference as the turbine and producing the circulation of the gases in the system.

In testimony that I claim the foregoing as my invention, I have signed my name in presence of two subscribing witnesses.

EMIL EDWIN.

Witnesses:
  KARL L. LEE,
  C. NORMAN.